June 1, 1943.  H. B. BROSE  2,320,910
AUTOMATIC SLIDE PROJECTOR
Filed April 27, 1942
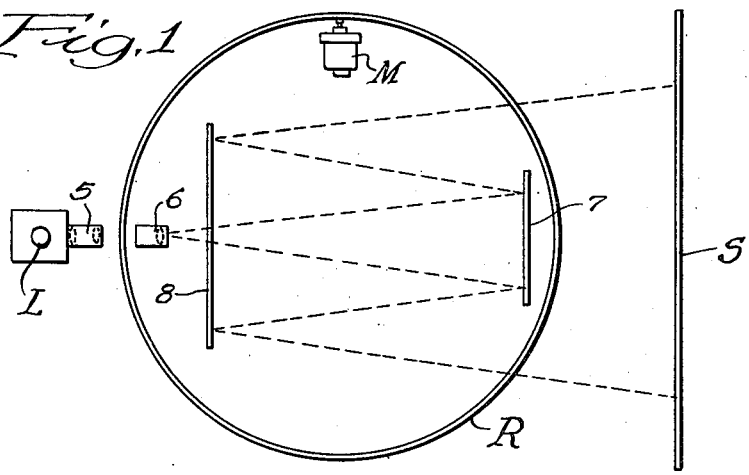
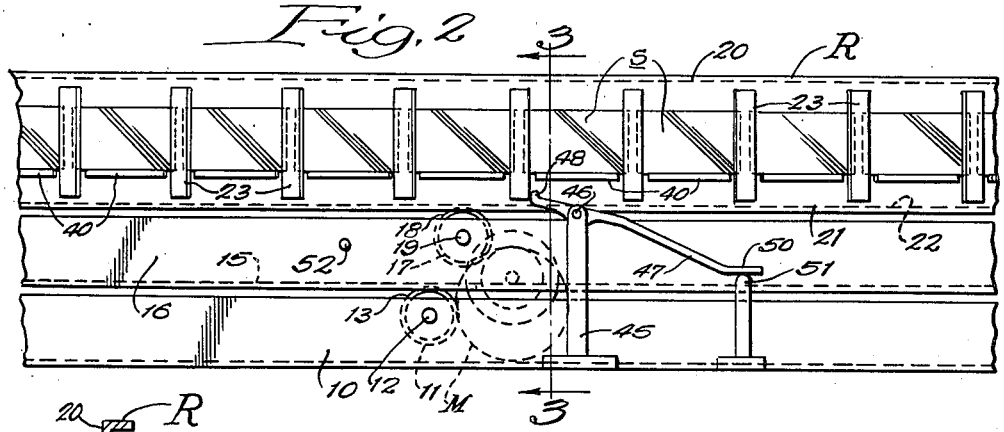
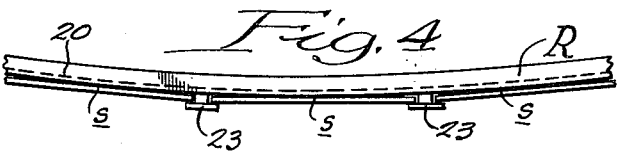
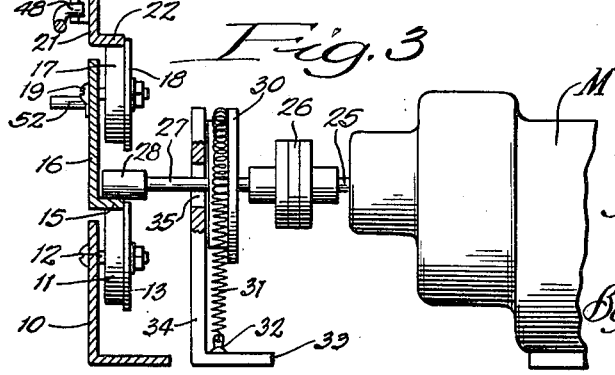
Inventor:
Horace B. Brose,
By Cumming & Cumming
Attorneys.

Patented June 1, 1943

2,320,910

UNITED STATES PATENT OFFICE 2,320,910

AUTOMATIC SLIDE PROJECTOR

Horace B. Brose, Chicago, Ill.

Application April 27, 1942, Serial No. 440,639

8 Claims. (Cl. 88—27)

The present invention which relates generally to automatic slide projectors is concerned particularly with means by which a plurality of slides are successively advanced in timed relation in the path of light rays which transmit images from the slides to a screen for display thereon. Such a projector may be used to advantage for display or instruction purposes in public places, store windows, and elsewhere.

It is a primary object of my invention to devise means for supporting a plurality of slides in a circular mounting supported upon and adapted to be driven by a constantly rotating ring which is driven by a motor having a simple and effective transmission for the purpose. My invention is concerned also with a trigger release means by which the circular mounting is permitted to advance periodically the distance of a single slide, and, in doing this, to accelerate easily and noiselessly from a standing start to a predetermined point of rest. These and other features, which will more clearly hereinafter appear from the specification and claims, are set forth in the accompanying drawing wherein—

Figure 1 is a diagrammatic plan view of the mechanism in its entirety;

Fig. 2 is a fragmentary side elevation of the circular slide mounting and trigger release therefor;

Fig. 3 is an enlarged detail in vertical section, taken on line 3—3 of Fig. 2; and Fig. 4 is a fragmentary view in plan, showing a plurality of slides in place within the circular mounting therefor.

According to the showing in Fig. 1, I may employ a light source L from which rays pass through lens systems 5 and 6 on to a mirror 7, thence back to a second mirror 8 from whence the projected images are cast on to a screen S. Such a light system is arranged in part within and in part without a series of superimposed rings R forming a carrier for the slides, as will now be explained.

Upon a suitable base (not shown) is mounted a fixed ring 10 whereon is supported a plurality of free running wheels 11 at spaced apart intervals. As shown, each wheel lies to the inside of the fixed ring with which it is connected as by an axle pin 12, and a flange 13 extends from each wheel adjacent the inside face thereof. Supported and guided upon the several wheels 11 is a flange 15 extended inwardly from a drive ring 16 of substantially the same diameter as the fixed ring 10. This drive ring also carries upon its inside face a plurality of free running wheels 17, each formed with a flange 18 and connected with the drive ring as by an axle pin 19. It will be noted that the diameters and mountings of all the wheels just described are such that the wheels extend slightly above the upper edges of the respective rings whereon they are mounted, and it is due to this fact that the drive ring is spaced slightly above the fixed ring, as shown.

I provide also a circular slide mounting which, as shown, comprises top and bottom rings 20 and 21, respectively, each having a diameter substantially the same as the drive ring 16 and fixed ring 10. Extending inwardly from the lower edge of the bottom slide ring is a flange 22 adapted to ride upon the several wheels 17 which are carried by the drive ring. The flanges of these wheels guide the bottom slide ring in its movements through a circular path about a fixed center. As by means of vertical spaced apart bars 23 connected to the top and bottom rings of the slide mounting these two rings are joined in a fixed spaced relation, the bars defining window openings for a purpose that will presently appear.

Within the space interiorly of the three superposed rings is a motor M having a drive shaft 25 extending through one bearing thereof. This shaft is in connection, as by a universal or free play coupling 26, with a stub shaft 27 which carries at its opposite end a friction roller 28 of relatively small diameter resting upon the flange 15 of the drive ring. Also mounted upon the stub shaft is a free running flanged wheel 30 over which is trained a compression spring 31, the ends of which are secured, as at 32, to the laterally extended base 33 of an upright bracket 34 wherein is a vertical slot 35 affording a bearing for the stub shaft. By the means described, a down pressure is exerted on the stub shaft, which is guided within the slot 35, to maintain the friction roller 28 against the flange 15 with sufficient force to assure transmission thereto of a driving force which will produce constant rotation of the drive ring in response to operation of the motor.

The slide mounting bars 23 may be of T section to provide opposing channels (see Fig. 4) adapted to receive and sustain a slide s whose lower edge is adapted to rest upon a ledge 40. When so positioned, the slide will lie above the bottom ring 21 and below the top ring 20 so as to be exposed to the rays emanating from the light source L. In this way the image on the slide will be transmitted via the reflectors 7 and 8 to the screen S.

With the motor in continuous operation the drive ring 16 is maintained in constant rotation. It rides freely upon the flanged wheels 11 and tends also to advance with it the circular slide mounting which is supported upon the flanged wheels 17. Because of the anti-friction support which is provided, the slide mounting will tend to rotate with only a very small pressure exerted against any stop device by which its motion is to be arrested; and for the same reason if all interference to its rotation be removed, the slide mounting will accelerate very gently when acquiring motion from its contact with the freely running supporting wheels 17. I take advantage of this form of transmission to associate with the mounting ring an escapement mechanism which will now be described.

Extending upwardly to the outside of the base ring 10 is a bracket support 45 whereon is pivotally mounted, as at 46, a trigger comprising a lever 47 having a head 48 which lies close to the slide ring 20 in the movement path of the lower ends of the T bars 23. The lever end opposite the head terminates in an over-balancing foot 50 adapted to rest upon a post 51 when the lever is in its normal position (see Fig. 2). From the pivot point 46 toward the foot 50 the lever is inclined downwardly after the manner of a cam so as to receive successive engagement from a plurality of trip pins 52, each extended outwardly from the drive ring 16 whose direction of movement is to the right as viewed in Fig. 2. As there shown, the circular slide mounting is normally held against movement by engagement of the trigger head 48 with one of the T-bar stops at a point near its lower end. With continued movement of the drive ring, however, one of the trip pins 52 will advance to trip the trigger lever 47. In so doing the trigger head 48 drops to the point that the circular slide mounting is free for rotation in response to the movement of the drive ring whereon it is freely supported. When the trip pin 52 has passed under the trigger, the lever will assume its normal position in which the head 48 is again raised into interfering position relative to the next succeeding T-bar stop. The slide mounting is accordingly permitted to advance only a distance equal to the spacing between two adjacent T-bars in response to each operation of the trigger mechanism. This simple form of escapement will operate dependably over a long period of service, inasmuch as it is never subject to any force of appreciable magnitude.

The mechanism in its entirety, except perhaps only the light source, may be accommodated within a small cabinet or upon the walls thereof, this being possible because of the compact arrangement of the various operating units.

I claim:

1. An automatic slide projector in which is comprised a continuously rotating drive means and thereover a circular slide mounting, anti-friction means interconnecting the drive means and slide ring mounting and affording a rotatable support for the latter, a plurality of spaced apart stops on the slide mounting, a trigger engageable successively with each stop to arrest movement of the slide mounting without interrupting continuous rotation of the drive means, and a plurality of spaced apart trip means carried by the drive means adapted in succession to trip the trigger whereby to release the circular slide mounting for movement, in response to forces transmitted through the anti-friction means from the drive means, through a distance equal to the spacing between the stops, the distance between the trip means in conjunction with the speed of movement of the drive means determining the period of pause of the circular slide mounting.

2. An automatic slide projector in which is comprised a fixed base ring, a plurality of free-running flanged wheels carried by the base ring and exposed beyond the upper edge thereof, a drive ring of substantially the same diameter as the base ring rested along its lower edge portion upon the rollers of the base ring and freely rotatable thereupon, means for imparting continuous rotation to the drive ring, a plurality of free-running flanged wheels carried by the driving ring and exposed beyond the upper edge thereof, a circular slide mounting over the drive ring comprising a pair of vertically spaced rings the lower of which is adapted to ride upon the wheels of the drive ring so as to be rotatable coaxially therewith, the two rings of the circular slide mounting being interconnected by spaced apart vertical bars each affording opposite channels within which one edge of a slide may be received, an escapement operable to release the circular mounting for rotation with the drive ring, and spaced apart trip means carried by the drive ring for operating the escapement to permit advance of the circular mounting with the drive ring through a fixed distance.

3. An automatic slide projector in which is comprised a drive ring having an inturned flange adjacent its lower edge, means affording a rotatable mounting for the drive ring, means for imparting rotation to the drive ring including a friction roller engaging the top edge of the inturned flange thereof, a stub shaft connected fast to the friction roller, a universal connection between the stub shaft and a power shaft, means exerting a downward tension on the stub shaft adapted to cause the friction roller to bear with increased pressure against the flange of the drive ring, a circular mounting ring associated with the drive ring and mounted for rotation coaxially therewith, an escapement operable by movement of the drive ring for releasing the circular mounting for intermittent rotation, and anti-friction means interconnecting the drive ring and circular mounting and affording the sole power transmission therebetween.

4. An automatic slide projector in which is comprised a drive ring having a flange, means affording a rotatable mounting for the drive ring, means for imparting rotation to the drive ring including a friction roller engaging the flange thereof, a stub shaft connected fast to the friction roller, a universal connection between the stub shaft and a power shaft, means exerting a lateral tension on the stub shaft adapted to cause the friction roller to bear with increased pressure against the flange of the drive ring, a circular mounting ring associated with the drive ring and mounted for rotation coaxially therewith, an escapement operable by movement of the drive ring for releasing the circular mounting for intermittent rotation, and anti-friction means interconnecting the drive ring and circular mounting and affording the sole power transmission therebetween.

5. An automatic slide projector in which is comprised a drive ring, means affording a rotatable mounting for the drive ring, means for imparting rotation to the drive ring including a friction roller engaging therewith, a stub shaft connected fast to the friction roller, a universal connection between the stub shaft and a power shaft, means exerting a downward tension on the stub shaft adapted to cause the friction roller to bear with increased pressure against the drive ring, a circular mounting ring associated with the drive ring and mounted for rotation coaxially therewith, an escapement operable by movement of the drive ring for releasing the circular mounting for intermittent rotation, and anti-friction means interconnecting the drive ring and circular mounting and affording the sole power transmission therebetween.

6. An automatic slide projector in which is comprised a circular slide mounting, a plurality of wheeled supports whereon the circular mounting may rotate about a fixed axis, a drive ring mounted for rotation about the same axis and affording a mounting for the wheeled supports for the circular mounting, a continuously-operating power source, a transmission leading from the power source to the drive ring and including a friction roller in engagement therewith, tension means for maintaining the friction roller with pressure against the drive ring, and a gravity-operated escapement for the circular mounting operable by means connected with the drive ring adapted to release the circular mounting for intermittent rotary movement with the drive ring.

7. An automatic slide projector in which is a circular slide rotatable about a fixed axis, a transmission therefor in which is comprised a rotatable drive ring mounting a plurality of wheels whereon the circular slide is both mounted and guided for rotation about a fixed axis, means for imparting continuous rotation to the drive ring, an escapement operable to release the circular slide for movement with the drive ring in response to a relatively frictionless rotary force transmitted therefrom, and spaced apart trip means carried by the drive ring for periodically operating the escapement to permit advance of the circular slide with the drive ring through a fixed distance.

8. An automatic slide projector in which is a circular slide, a mounting therefor comprising a transmission element in the form of a drive ring, anti-friction means carried by the drive ring and supporting thereon the circular slide, means for imparting continuous rotation to the drive ring, a gravity-operated escapement operable to release the circular slide for rotation with the drive ring, and spaced apart trip means associated with the drive ring and exerting periodically upon the escapement a releasing force such as to permit advance of the circular slide through a fixed distance in response to a relatively frictionless rotary force transmitted from the drive ring.

HORACE B. BROSE.